(12) United States Patent
Wilds et al.

(10) Patent No.: US 11,449,494 B2
(45) Date of Patent: Sep. 20, 2022

(54) DISTRIBUTED SECURE DATABASE SYSTEM USING AN EVOLVING NONCE

(71) Applicant: Raytheon Company, Waltham, MA (US)

(72) Inventors: Andrew M. Wilds, Sahuarita, AZ (US); Gregory M. Wagner, Tucson, AZ (US); Craig O. Shott, Tucson, AZ (US); James N. Head, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 17/136,905

(22) Filed: Dec. 29, 2020

(65) Prior Publication Data
US 2022/0207021 A1   Jun. 30, 2022

(51) Int. Cl.
| | | |
|---|---|---|
| *G06F 16/00* | (2019.01) | |
| *G06F 16/23* | (2019.01) | |
| *G06F 16/27* | (2019.01) | |
| *G06F 16/22* | (2019.01) | |
| *G06F 21/64* | (2013.01) | |

(52) U.S. Cl.
CPC ...... *G06F 16/2379* (2019.01); *G06F 16/2255* (2019.01); *G06F 16/27* (2019.01); *G06F 21/64* (2013.01)

(58) Field of Classification Search
CPC ... G06F 16/2379; G06F 16/27; G06F 16/2255
See application file for complete search history.

(56) References Cited

U.S. PATENT DOCUMENTS

| | | | |
|---|---|---|---|
| 10,243,748 B1 | 3/2019 | Callan et al. | |
| 10,389,518 B2 | 8/2019 | Chen et al. | |
| 11,164,180 B1* | 11/2021 | Rhea | G06Q 20/3674 |
| 2018/0013567 A1* | 1/2018 | Davis | H04L 9/3242 |
| 2019/0243980 A1 | 8/2019 | Inamdar et al. | |
| 2019/0268142 A1 | 8/2019 | Leker et al. | |
| 2019/0379538 A1 | 12/2019 | Oh et al. | |
| 2020/0059362 A1 | 2/2020 | Brody et al. | |

(Continued)

FOREIGN PATENT DOCUMENTS

WO   WO-2019191378 A1   10/2019

OTHER PUBLICATIONS

Nakamoto, Satoshi, "Bitcoin: A Peer-to-Peer Electronic Cash System", (2009), 1-9.

(Continued)

*Primary Examiner* — Khanh B Pham
(74) *Attorney, Agent, or Firm* — Schwegman Lundberg & Woessner, P.A.

(57) ABSTRACT

A distributed secured database system includes a ledger, a transmitting device, edge devices, and a time synchronization source. An evolving nonce is generated at the transmitting device and the edge devices. The evolving nonce is time-synced across the transmitting device and the edge devices. A hash value is generated at the transmitting device and the edge devices using the evolving nonce. The hash value is verified at the transmitting device and each of the edge devices during a particular time frame. A block is added to the distributed secured database system when the hash value is verified by the transmitting device and the edge devices.

20 Claims, 3 Drawing Sheets

(56) References Cited

U.S. PATENT DOCUMENTS

| | | |
|---|---|---|
| 2020/0067708 A1 | 2/2020 | Subba |
| 2020/0106610 A1 | 4/2020 | Doddavula et al. |
| 2020/0128043 A1* | 4/2020 | Xie .................... H04L 63/1416 |
| 2020/0311678 A1 | 10/2020 | Fletcher et al. |
| 2021/0021424 A1* | 1/2021 | Punal ................... H04L 9/3236 |
| 2021/0295321 A1* | 9/2021 | Liu ..................... G06Q 20/401 |

OTHER PUBLICATIONS

"International Application Serial No. PCT US2021 064968, International Search Report dated Apr. 13, 2022", 5 pgs.
"International Application Serial No. PCT US2021 064968, Written Opinion dated Apr. 13, 2022", 6 pgs.
Lijing, Zhou, "CP-consensus: a Blockchain Protocol Based on Synchronous Timestamps of Compass Satellite", IACR, International Association for Cryptologic Research vol. 20171031:152717, (Oct. 31, 2017), 1-11.

* cited by examiner

DISTRIBUTED SECURE DATABASE SYSTEM USING AN EVOLVING NONCE

TECHNICAL FIELD

Embodiments described herein generally relate to distributed, secure databases, and in an embodiment, but not by way of limitation, a distributed, secure database that uses an evolving nonce.

BACKGROUND

A distributed, secure database system can be referred to as a blockchain, which is a growing list of blocks or records that are linked via some type of cryptographic technique. The cryptographic technique is typically the solving of a complex mathematical problem, and it is normally referred to as cryptomining. Each block in the blockchain includes a cryptographic hash of the previous block in the blockchain, a timestamp, and data.

A blockchain is resistant to modification of its data, because once recorded, the data in any given block cannot be altered retroactively without alteration of all subsequent blocks. For use as a distributed ledger, a blockchain is typically managed by a peer-to-peer network collectively adhering to a protocol for inter-node communication and validating new blocks. Although blockchain records are not unalterable, blockchains are extremely secure when large numbers of devices or nodes are used. Blockchain technology can be referred to as an open, distributed ledger that can record transactions between two or more parties efficiently in a verifiable and permanent way.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

In a typical distributed, secure database system or blockchain, there are thousands of entities, devices, or nodes. A well-known example of such a blockchain is the cryptocurrency Bitcoin. The vast size of such a blockchain network, in combination with the difficulty of the cryptomining that is associated with the blockchain and the voting requirements to settle disputes, make it virtually impossible to improperly change a block in the blockchain or improperly add a block to the blockchain. However, in smaller blockchain systems, it may be easier to breach the blockchain via methods of attack that manipulate one or more blocks. For example, such systems could include less than one hundred entities, devices, or nodes; systems established with a publish/subscribe architecture; or a device network where all connected devices are "whitelisted." An embodiment of the present disclosure addresses these issues, and it provides a secure blockchain system for any size of blockchain, especially those with a relatively small number of entities, devices, or nodes.

Figure 1:
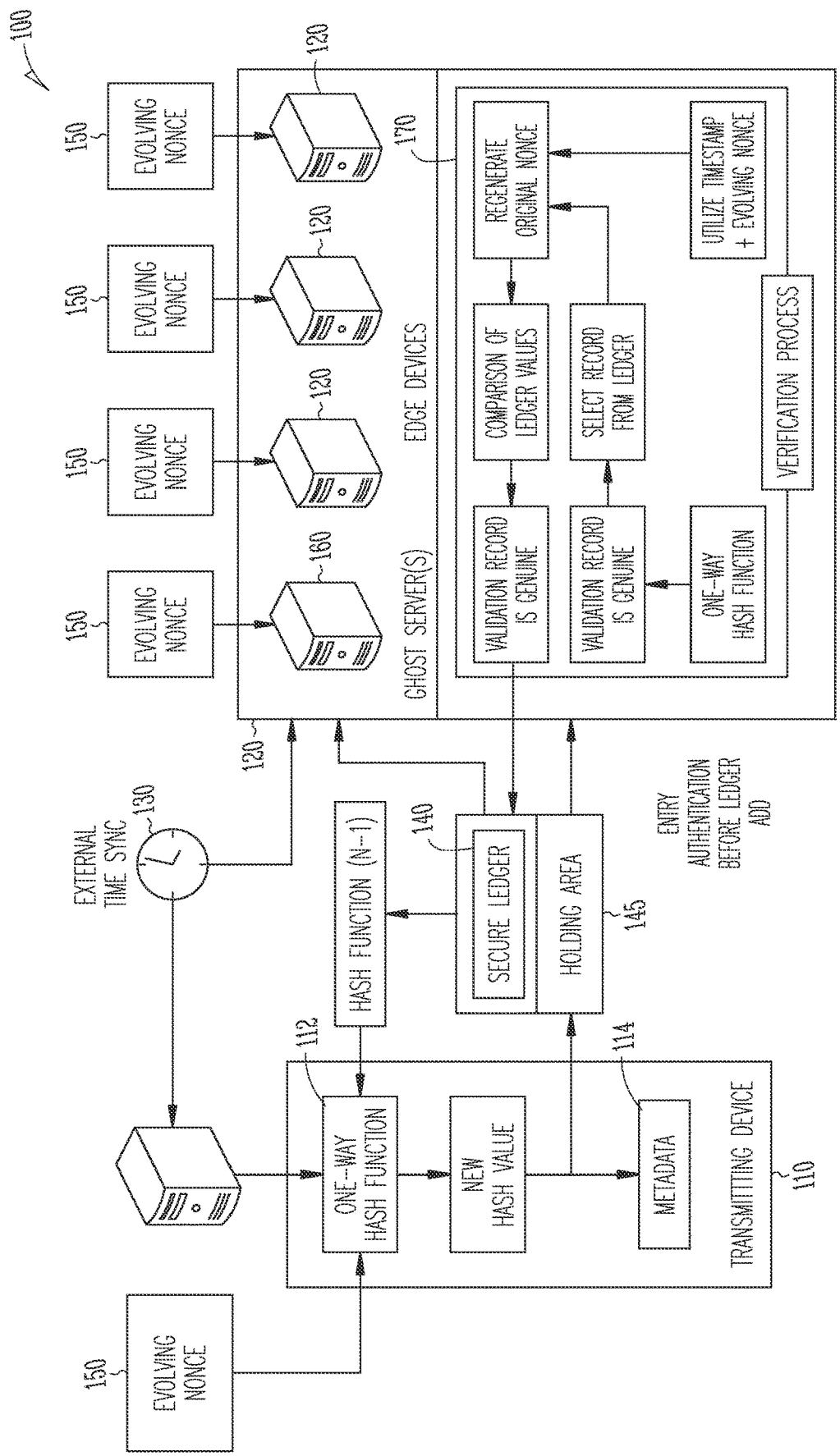
FIG. 1 is a block diagram of a distributed, secure database system using an evolving nonce.
Figure 2:
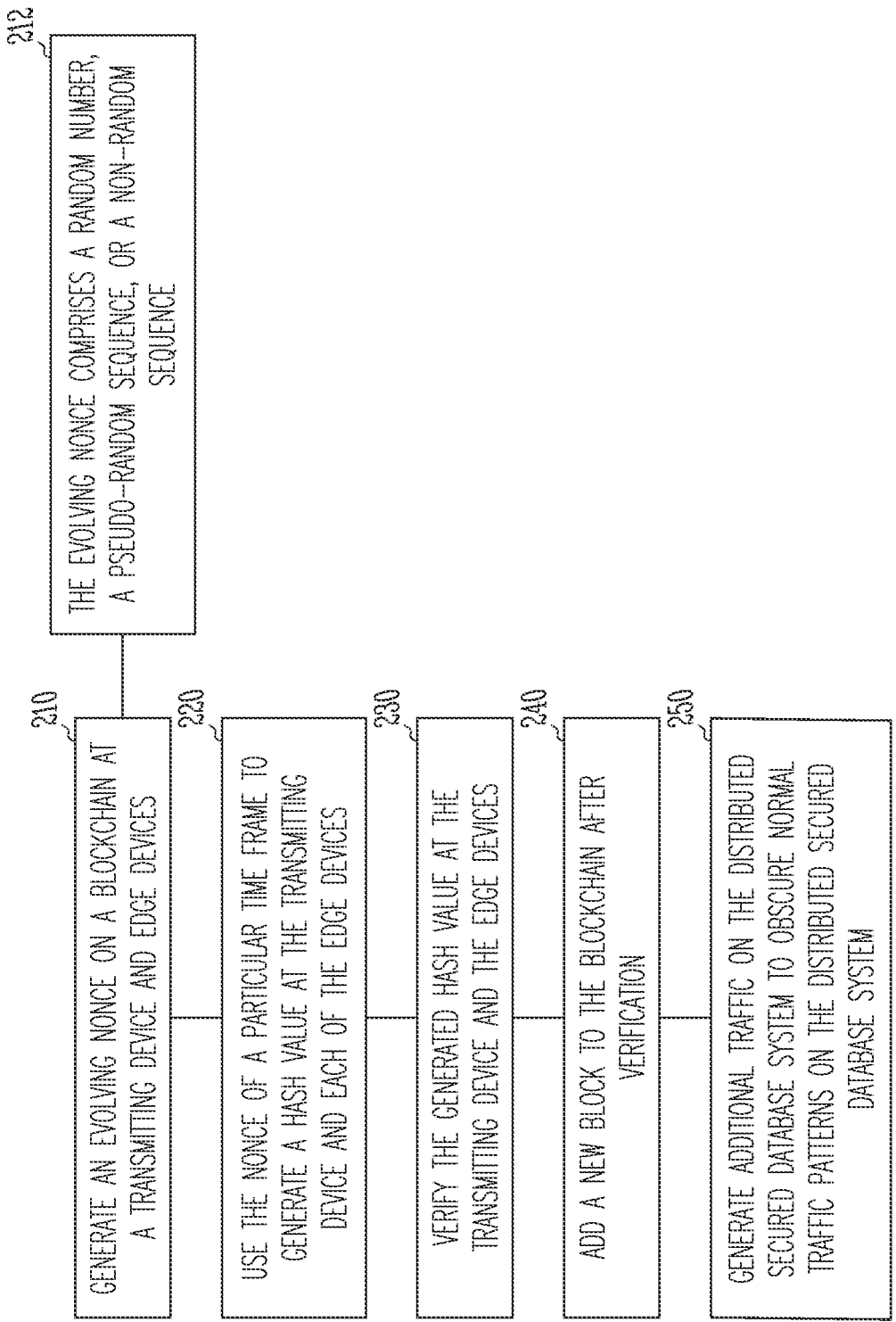
FIG. 2 is a block diagram illustrating features and operations of a distributed, secure database system that uses an evolving nonce.

FIG. 1 is a block diagram illustrating the components of a distributed, secure database system using an evolving nonce. FIG. 2 is a block diagram illustrating features and operations of a distributed, secure database system that uses an evolving nonce.

Referring first to FIG. 1, a blockchain 100 includes a transmitting device 110, edge devices 120, an external time synchronization source 130, and a ledger 140. The transmitting device and edge devices have access to the ledger 140. The ledger 140 has a holding area 145. Evolving nonces 150 are generated for the transmitting device 110 and the edge devices 120. The nonce may be hosted on the transmitting device, it may exist separate from the transmitting device, or it may be separable from the transmitting device when not in use. An embodiment includes one or more ghost servers 160, the function of which will be discussed below in connection with FIG. 2. As further discussed below, before a transaction or block is added to the blockchain 100, the transaction or block must be verified and validated according to the described method at 170.

FIG. 2 includes a number of process blocks 210-250. Though arranged substantially serially in the example of FIG. 2, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now specifically to FIG. 2, at 210, an evolving nonce 150 is generated at the transmitting device and each of the plurality of edge devices. As noted at 212, the evolving nonce 150 may be a random number, pseudo-random or non-random sequences generated by known algorithms (e.g., elliptic curve key generation), and/or pseudo-random or non-random sequences generated by future-developed algorithms. Because the transmitting device 110 and each of the edge devices 120 are coupled to the external time source 130, the same nonce value can be generated for all of these devices at a particular time. Additionally, the blockchain 100 can constantly and continuously generates nonces, at either equal intervals or varying intervals, which, in low transaction systems, are aided by the one or more ghost servers 160 acting to seed valid blocks onto the blockchain. For example, the blockchain 100 can generate nonces at a rate of every second or so. These time frames can be constant, for example, every second, or the time frames can be variable, such as a first time frame of a second, a second time frame of four seconds, a third time frame of two seconds, a fourth time frame of one second, etc. Each one of these generated nonces are time-synced, so that in a particular time frame, the transmitting device 110 and each of the edge devices 120, knowing the public information, are able to validate the nonce for a block by either solving directly, or given a public-private key architecture, they may solve the public key. Consequently, unlike traditional blockchains wherein the generation of a nonce involves cryptomining, extensive and difficult problem solving and calculations, on a limited frequency, and much time, the evolving nonces of the present disclosure can be generated at very frequent time periods (such as whenever a new transaction is available). Additionally, traditional blockchains rely on complexity of solving a nonce as increasingly computationally complex driving scarcity, whereas in an embodiment of the present disclosure nonce generation is relatively easy, but drives a system which is more computationally complex to add or modify entries without authority.

At 220, the nonce of a particular time frame is used to generate a hash value at the transmitting device 110 and each of the edge devices 120. Referring again to FIG. 1, a one-way hash function 112 is used to generate the hash value. In an embodiment, metadata 114 can be used in the creation of the hash value. In another embodiment, the hash value is generated by providing to the one-way hash function 112 a previous hash value from a previous block, an external timestamp from the time synchronization source, and the evolving nonce.

At 230, the generated hash value is verified at the transmitting device 110 and each of the edge devices 120. Block 170 of FIG. 1 illustrates this verification process. After the generation of the new hash value in the transmitting device 110 and each of the edge devices 120, the hash value is placed in the holding area 145 of the secure ledger 140. The verification process does not require voting like cryptocurrency-based distributed ledgers and is done on each individual edge device. For verification of a record, an edge device has the hash value from the verified previous record in the ledger, a timestamp value of when the current record was generated, and the evolving nonce value associated with the time the record was generated. All of these values are concatenated into a string and hashed with the same function used to generate all other records on the ledger. If the hash value is the same as that of the record being verified, the block is genuine; if the hash values do not match the record, it is an imposter and it is removed from the ledger.

After the new hash value has been verified at the transmitting device 110 and each of the edge devices 120, that at 240, a new block is added to the distributed secured database system. The result of operations 210-240 is that if the edge devices 120 are out of sync in the limited time window of nonce generation, a block will not be added to the block chain. This is in contrast to traditional blockchains, which rely on the solving of complex mathematical problems (cryptomining) and a voting scheme to resolve disputes. Additionally, the ledger in holding area and the original ledger must match. If they do, a new block is added to the blockchain. If they do not, a new block is not added to the block chain.

At 250, the ghost server 160 of FIG. 1 generates transactions on the blockchain 100 on an aperiodic, a semi-periodic, and/or a partially constrained time basis so as to obscure normal traffic patterns in addition to providing added blockchain security. Nonces may or may not be generated in connection with these transactions generated by the ghost server 160. Rather, the purpose of a ghost server transaction is simply to put traffic on the blockchain network. These transactions serve as a smokescreen, which makes it even harder for a third party to breach or hack the blockchain 100.

Figure 3:
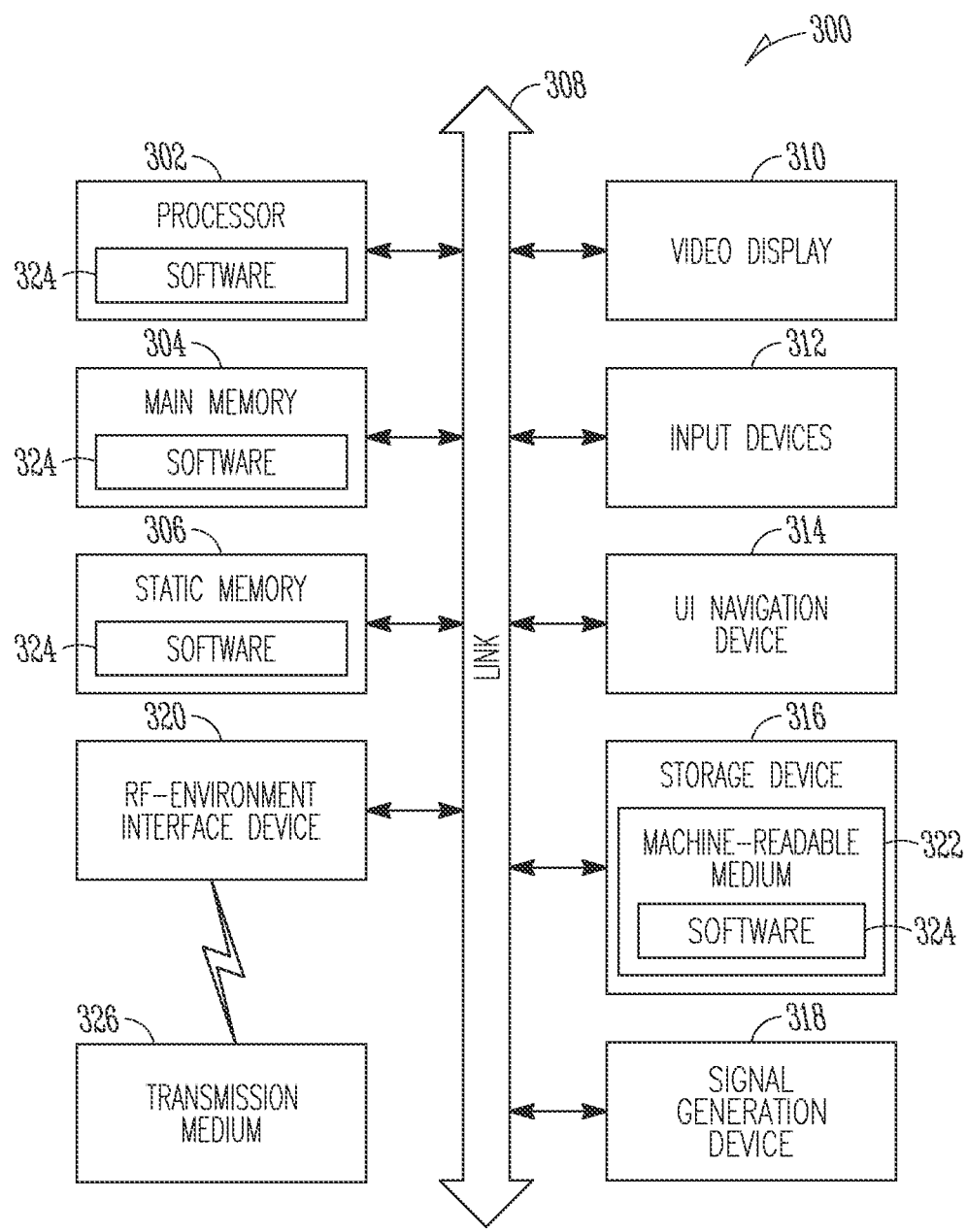
FIG. 3 is a block diagram of a computer system upon which one or more of the disclosed embodiments can execute.

FIG. 3 is a block diagram illustrating a computing and communications platform 300 in the example form of a general-purpose machine on which some or all the operations of FIGS. 1 and 2 may be carried out according to various embodiments. In certain embodiments, programming of the computing platform 300 according to one or more particular algorithms produces a special-purpose machine upon execution of that programming. In a networked deployment, the computing platform 300 may operate in the capacity of either a server or a client machine in server-client network environments, or it may act as a peer machine in peer-to-peer (or distributed) network environments.

Example computing platform 300 includes at least one processor 302 (e.g., a central processing unit (CPU), a graphics processing unit (GPU) or both, processor cores, compute nodes, etc.), a main memory 304 and a static memory 306, which communicate with each other via a link 308 (e.g., bus). The computing platform 300 may further include a video display unit 310, input devices 312 (e.g., a keyboard, camera, microphone), and a user interface (UI) navigation device 314 (e.g., mouse, touchscreen). The computing platform 300 may additionally include a storage device 316 (e.g., a drive unit), a signal generation device 318 (e.g., a speaker), and a RF-environment interface device (RFEID) 320.

The storage device 316 includes a non-transitory machine-readable medium 322 on which is stored one or more sets of data structures and instructions 324 (e.g., software) embodying or utilized by any one or more of the methodologies or functions described herein. The instructions 324 may also reside, completely or at least partially, within the main memory 304, static memory 306, and/or within the processor 302 during execution thereof by the computing platform 300, with the main memory 304, static memory 306, and the processor 302 also constituting machine-readable media.

While the machine-readable medium 322 is illustrated in an example embodiment to be a single medium, the term "machine-readable medium" may include a single medium or multiple media (e.g., a centralized or distributed database, and/or associated caches and servers) that store the one or more instructions 324. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks; and field programmable gate arrays (FPGA).

RFEID 320 includes radio receiver circuitry, along with analog-to-digital conversion circuitry, and interface circuitry to communicate via link 308 according to various embodiments. Various form factors are contemplated for RFEID 320. For instance, RFEID may be in the form of a wideband radio receiver, or scanning radio receiver, that interfaces with processor 302 via link 308. In one example, link 308 includes a PCI Express (PCIe) bus, including a slot into which the NIC form-factor may removably engage. In another embodiment, RFEID 320 includes circuitry laid out on a motherboard together with local link circuitry, processor interface circuitry, other input/output circuitry, memory circuitry, storage device and peripheral controller circuitry, and the like. In another embodiment, RFEID 320 is a peripheral that interfaces with link 308 via a peripheral input/output port such as a universal serial bus (USB) port. RFEID 320 receives RF emissions over wireless transmission medium 326. RFEID 320 may be constructed to receive RADAR signaling, radio communications signaling, unintentional emissions, or some combination of such emissions.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A distributed secured database system comprising:
   a ledger;
   a transmitting device;
   a plurality of edge devices; and
   a time synchronization source;
   wherein the distributed secured database system is operable for:
   generating an evolving nonce at the transmitting device and each of the plurality of edge devices, the evolving nonce time-synced across the transmitting device and each of the plurality of edge devices such that a same nonce value is generated for the transmitting device and each of the plurality of edge devices at a particular time of a particular time frame;
   generating a hash value at the transmitting device and each of the plurality of edge devices using the evolving nonce;
   verifying the hash value at the transmitting device and each of the plurality of edge devices associated with the particular time; and
   adding a block to the distributed secured database system when the hash value is verified by the transmitting device and each of the plurality of edge devices.

2. The distributed secured database system of claim 1, comprising a server, wherein the server is operable for generating additional traffic on the distributed secured database system to obscure normal traffic patterns on the distributed secured database system.

3. The distributed secured database system of claim 1, wherein the hash value is generated by providing to a one-way hash function a previous hash value from a previous block, an external timestamp from the time synchronization source, and the evolving nonce.

4. The distributed secured database system of claim 3, comprising adding metadata to the hash value.

5. The distributed secured database system of claim 1, wherein the particular time frame comprises a constant time frame or a variable time frame.

6. The distributed secured database system of claim 1, wherein the evolving nonce comprises a random number, a pseudo-random sequence, or a non-random sequence.

7. The distributed secured database system of claim 1, comprising generating a plurality of nonces at a varying frequency.

8. A process for creating and maintaining a distributed secured database comprising:
   generating an evolving nonce at a transmitting device and each of a plurality of edge devices, the evolving nonce time-synced across the transmitting device and each of the plurality of edge devices such that a same nonce value is generated for the transmitting device and each of the plurality of edge devices at a particular time of a particular time frame;
   generating a hash value at the transmitting device and each of the plurality of edge devices using the evolving nonce;
   verifying the hash value at the transmitting device and each of the plurality of edge devices associated with the particular time by, using public information, directly solving for a public key, or by, using a public-private key architecture, indirectly solving for the public key; and
   adding a block to the distributed secured database system when the hash value is verified by the transmitting device and each of the plurality of edge devices.

9. The process of claim 8, comprising a server, wherein the server is operable for generating additional traffic on the distributed secured database system to obscure normal traffic patterns on the distributed secured database system.

10. The process of claim 8, wherein the hash value is generated by providing to a one-way hash function a previous hash value from a previous block, an external timestamp from the time synchronization source, and the evolving nonce.

11. The process of claim 10, comprising adding metadata to the hash value.

12. The process of claim 8, wherein the particular time frame comprises a constant time frame or a variable time frame.

13. The process of claim 8, wherein the evolving nonce comprises a random number, a pseudo-random sequence, or a non-random sequence.

14. The process of claim 8, comprising generating a plurality of nonces at a varying frequency.

15. A non-transitory computer readable medium comprising instructions for creating and maintaining a distributed secured database that, when executed by a processor, execute a process comprising:
   generating an evolving nonce at a transmitting device and each of a plurality of edge devices, the evolving nonce time-synced across the transmitting device and each of the plurality of edge devices such that a same nonce value is generated for the transmitting device and each of the plurality of edge devices at a particular time of a particular time frame;
   generating a hash value at the transmitting device and each of the plurality of edge devices by concatenating into a string a hash value from a verified previous record in the distributed secured database, a timestamp value of a current record, and the evolving nonce;
   verifying the hash value at the transmitting device and each of the plurality of edge devices associated with the particular time; and
   adding a block to the distributed secured database system when the hash value is verified by the transmitting device and each of the plurality of edge devices.

16. The non-transitory computer readable medium of claim 15, comprising a server coupled to the non-transitory computer-readable medium, wherein the server is operable for generating additional traffic on the distributed secured database system to obscure normal traffic patterns on the distributed secured database system.

17. The non-transitory computer readable medium of claim 15, wherein the hash value is generated by providing to a one-way hash function a previous hash value from a previous block, an external timestamp from the time synchronization source, and the evolving nonce.

18. The non-transitory computer readable medium of claim 17, comprising adding metadata to the hash value.

19. The non-transitory computer readable medium of claim 15, wherein the particular time frame comprises a constant time frame or a variable time frame.

20. The non-transitory computer readable medium of claim 15, wherein the evolving nonce comprises a random number, a pseudo-random sequence, or a non-random sequence; and comprising generating a plurality of nonces at a varying frequency.

* * * * *